J. W. Brady.
Coffee Cleaner.
N° 93,045.  Patented Jul. 27, 1869.
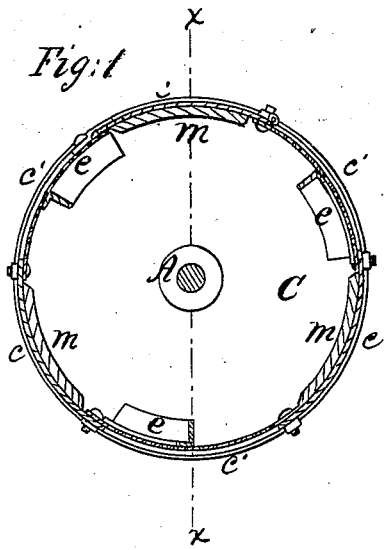
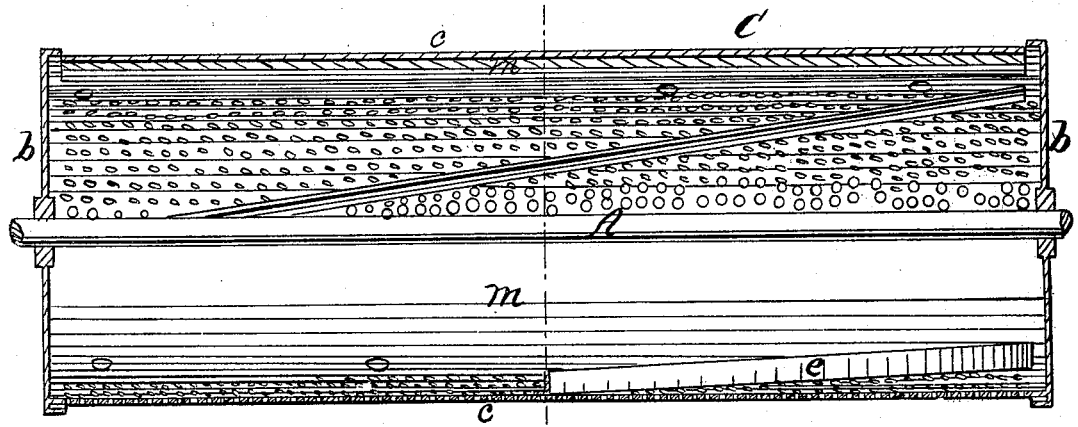
Witnesses
C. A. Pettit
S. Keenon
Inventor
J. W. Brady
by Munn & Co.
Attorneys.

United States Patent Office.

JAMES W. BRADY, OF CATONSVILLE, ASSIGNOR TO M. W. BRADY, OF BALTIMORE, MARYLAND.

IMPROVEMENT IN COFFEE CLEANERS AND POLISHERS.

Specification forming part of Letters Patent No. 93,045, dated July 27, 1869.

*To all whom it may concern:*

Be it known that I, JAMES W. BRADY, of Catonsville, in the county of Baltimore and State of Maryland, have invented a new and Improved Coffee Cleaner and Polisher; and I do hereby declare that the following is a full, clear, and exact description of the construction and operation of the same, reference being had to the accompanying drawings, making a part of this specification, in which—

Figure 1 is a cross-section through line $y\,y$ of Fig. 2. Fig. 2 is a longitudinal section through line $x\,x$ of Fig. 1.

The object of this invention is to provide for public use a cheap, durable, and conveniently-operated instrument, by means of which coffee or other similar article can be easily, quickly, and effectually cleaned and polished. To accomplish this object, I employ a cylinder rotating on or with a shaft, the curved walls of the cylinder consisting of alternate plates of solid and perforated metal. The solid plates are lined with leather, rubber, or other material adapted to polish the kernel more rapidly than iron, and oblique wings are attached to the inner side of the perforated plates, in order to more effectually agitate the coffee and bring all parts of it to the wall, so that the fine dirt among its mass may escape through the holes in the cylinder.

In the drawings, A is a shaft, which may either be stationary or be driven by any available power applied in any convenient manner.

C is a cylinder rotating on or with the shaft A, and composed of the end pieces, $b\,b$, and alternate solid plates $c$ and foraminated plates $c'$, arranged as shown in the drawings, the metal employed for both species of plates being in large machines of about the thickness of ordinary boiler-iron, and the adjacent plates being bolted, riveted, or otherwise fastened together in such a manner that any one or more of them can easily be removed for repairs or for any other purpose. One or more of the plates may be hinged on one edge, so as readily to be opened and closed for the purpose of inserting and removing the material to be operated upon.

Along the inner face of the foraminated plates $c'$ are arranged oblique or spiral-shaped deflecting-plates $e\,e$, which, coming against the kernels of coffee as the cylinder revolves, will agitate the mass and bring the kernels one after another in contact with the perforated walls, thereby enabling the dust and litter from the coffee to escape continually until it is thoroughly cleansed.

The polishing material attached to the inner surface of the cylinder is shown at $m\,m$. It may consist of any suitable material—cloth, leather, gum, wood, or other substance—arranged in alternate strips or in spots or patches around the concave. The ends $b\,b$ may also be lined with a similar material and for the same purpose.

Having thus described my invention, I will here say that I do not claim the employment of a revolving cylinder, nor the use of a cylinder having its walls composed of alternate strips of solid metal and woven wire or wire sieves, for I am aware that such construction is shown in the patent of W. H. Elton, of which I am part owner, and under which I have been manufacturing; but

What I do claim as my invention is—

1. The oblique deflecting-plates $e\,e$, arranged upon the inner surface of the perforated metal plates $C'$, in combination with the polishing-plates $m$, of leather or equivalent material, substantially as described, for the purpose specified.

2. The polishing-plates $m\,m$, of leather or equivalent material, arranged alternately with the perforated metal plates $C'$, substantially as described, for the purpose specified.

3. A cylinder constructed with solid longitudinal plates $c\,c$, lined with the rubbers $m$, of leather or equivalent material, alternating with plates $c'\,c'$, of foraminated boiler-plate iron or other equivalent plate metal, substantially as and for the purposes set forth.

J. W. BRADY.

Witnesses:
J. P. TUSTING,
JNO. M. WALKER.